(12) United States Patent
Posch et al.

(10) Patent No.: US 6,814,295 B2
(45) Date of Patent: Nov. 9, 2004

(54) FREQUENCY SENSOR FOR EACH INTERFACE OF A DATA CARRIER

(75) Inventors: Stefan Posch, Graz (AT); Peter Kompan, Graz (AT); Peter Thueringer, Graz (AT); Wolfgang Meindl, Graz (AT); Klaus Ully, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 557 days.

(21) Appl. No.: 09/838,999

(22) Filed: Apr. 20, 2001

(65) Prior Publication Data

US 2002/0013914 A1 Jan. 31, 2002

(30) Foreign Application Priority Data

Apr. 20, 2000 (EP) .............................. 00890126

(51) Int. Cl.$^7$ .............................................. G06K 19/06
(52) U.S. Cl. ....................... 235/492; 235/451; 235/487; 361/737
(58) Field of Search ................................. 235/380, 492, 235/375, 382.5, 451, 487; 361/737; 710/301

(56) References Cited

FOREIGN PATENT DOCUMENTS

EP      0945828 A2    9/1999

Primary Examiner—Michael G. Lee
Assistant Examiner—Ahshik Kim
(74) Attorney, Agent, or Firm—Kevin Simons.

(57) ABSTRACT

A data carrier (4) for the transfer of communication data (KD1, KD2) via at least two interface means (11, 12), having first interface means (11) for receiving a first communication signal (KS1), and having second interface means (12) for receiving a second communication signal (KS2), and having processing means (13) to which a first clock signal (TS1) derived from the first communication signal (KS1) or a second clock signal (TS2) derived from the second communication signal (KS2) can be applied for the processing of the transferred communication data (KD1, KD2), and having reset means (21) for resetting the processing by the processing means (13), now includes a first frequency sensor (22) which is adapted to supply first frequency reset information (RI4) to the reset means (21) when a first clock frequency of the first clock signal (TS1) or the frequency (FKS1) of the first communication signal (KS1) lies below a first lower frequency threshold (FU1), and includes a second frequency sensor (23) which is adapted to supply second frequency reset information (RI5) to the reset means (21) when a second clock frequency of the second clock signal (TS2) or the frequency (FKS2) of the second communication signal (KS2) lies below a second lower frequency threshold (FU2), the reset means (21) being adapted to reset the processing by the processing means (13) when the first clock signal (TS1) is applied to the processing means (13) and the first frequency reset information (RI4) is received or when the second clock signal (TS2) is applied to the processing means (13) and the second frequency reset information (RI5) is received.

6 Claims, 2 Drawing Sheets

FREQUENCY SENSOR FOR EACH INTERFACE OF A DATA CARRIER

BACKGROUND OF INVENTION

1. Field of the Invention

The invention relates to a data carrier data carrier for the transfer of communication data via at least two interface means having first interface means for receiving a first communication signal, and having second interface means for receiving a second communication signal, and having processing means to which a first clock signal derived from the first communication signal or a second clock signal derived from the second communication signal can be applied for the processing of the transferred communication data and having reset means for resetting the processing by the processing means.

2. Description of Related Art

Such a data carrier of the type defined in the opening paragraph is known from the document EP 0 945 828 and is formed by a transponder of a smart card. In a contact-bound mode of operation the known data carrier is adapted to transfer communication data from or to a write/read station via a contact pad of the smart card The contact pad and the input stages arranged after the contact pad form first interface means which can inter alia receive a first communication signal from the write/read station, from which communication signal a first clock signal is derived.

In a contactless mode of operation the known data carrier is adapted to transfer communication data from or to a transmitting/receiving station via an antenna stage of the smart card. With the antenna stage a high frequency second communication signal can be received. The antenna stage and the input stages arranged after the antenna stage form second interface means. One of these input stages is a voltage supply stage for the voltage supply to the module of the data carrier and another input stage is a clock derivation stage by means of which a second clock signal of a second clock frequency is derived from the second communication signal.

The known data carrier further has processing means which include a central processing unit and a memory and which are adapted to process and store the communication data. For this purpose, either the first clock signal, the second clock signal or an additional internally generated third clock signal can be applied to the central processing unit, to define the processing frequency of the central processing unit.

The known data carrier further includes reset means to which reset information for resetting the processing in the central processing unit in the contactless mode of the voltage supply stage and the clock derivation stage of the second interface means. The voltage supply stage supplies reset information when it is not possible to generate an adequate supply voltage and the clock derivation stage supplies reset information when it is not possible to derive a second clock signal.

In the contact-bound mode the processing means can be reset by reset information received from the write/read station via the contact pad. Resetting of the processing of the processing means causes the processing of the communication data to be reset and the processing sequence to be repeated from the beginning. It has been found that the known data carrier has the drawback that in the contact-bound mode the processing clock applied to the processing means is not tested at all and in the contactless mode it is not tested whether the processing clock lies within given frequency thresholds, in order to guarantee a maximal security for the communication data processed by the processing means, which communication data may be security-related data. This is particularly important because by means of so-called voltage contrast analysis method a hacker could detect communication data processed and stored in a data carrier by applying a processing clock signal of very low clock frequency to the processing means and determining the variations of the potential at particular positions of the hardware of the data carrier with the aid of the electron microscope.

BRIEF SUMMARY OF THE INVENTION

It is an object of the invention to provide a data carrier in which even in the case of a simultaneous communication via both interface means a constantly high level of security is achieved for communication data processed and stored in the data carrier. According to the invention, in order to achieve this object with a data carrier of the type defined in the opening paragraph, a first frequency sensor is included, which is adapted to supply fist frequency reset information to the reset means when a first clock frequency of the first clock signal or the frequency of the first communication signal lies below a first lower frequency threshold, and a second frequency sensor is included, which is adapted to supply second frequency reset information to the reset means when a second clock frequency of the second clock signal or the frequency of the second communication signal lies below a second lower frequency threshold, and the reset means are adapted to reset the processing by the processing means when the first clock signal is applied to the processing means and the first frequency reset information is received or when the second clock signal is applied to the processing means and the second frequency reset information is received.

Thus, it is achieved that the frequencies of the first and the second communication signal applied to the data carrier via the first interface means and the second interface means or the clock frequencies of the clock signals derived from the communication signals are checked to ascertain whether they are higher than given lower frequency thresholds. The frequency sensors supply frequency reset information to the reset means if the clock signal applied to the processing means as processing clock has a clock frequency that is too low.

This has the advantage that, also in the case of parallel communication via both interface means, the reset means reset the processing means—resulting in a loss of communication data already processed—only when the clock frequency of the first or the second clock signal applied to the processing means as processing clock lies below the given lower frequency threshold and there is actually a security problem.

The measures defined in claim 2 have the advantage that the frequency sensors also check whether the clock frequencies of the first and the second clock signal or whether the frequency of the first and the second communication signal is higher than given upper frequency thresholds. This situation could give rise to impermissible operating conditions as a result of timing problems of the processing means, which conditions could be used by a hacker in order to detect security-related communication data.

The measures defined in claim 3 have the advantage that when neither via the first interface means nor via the second interface means a communication signal is received from which a clock signal could be derived and, as a consequence, no regular contactless or contact-bound communication with the write/read station or the transmitting/receiving station takes place, the reset means reset the processing means and thus preclude hacking of processed or stored communication data.

The measures defined in claim 4 have the advantage that it is not necessary to wait until the time of, for example, a few hundred microseconds required for power up upon a reset of the processing means has expired before the calculating stage 14 is again capable of processing communication data. Thus, the transmitting/receiving station or the write/read station can start the communication with the data carrier without any loss of time, which has the advantage that the communication can proceed more rapidly.

The measures defined in claim 5 have the advantage that, when the first frequency sensor indicates that the first clock frequency of the first clock signal is lower than the lower frequency threshold, the first clock derivation stage derives the first clock signal in a different manner so as to obtain a first clock signal whose first clock frequency is higher than the lower frequency threshold and is suitable as the first processing clock.

The measures defined in claim 6 have the advantage that the data carrier can be manufactured particularly cost-effectively.

BRIEF DESCRIPTION OF THE DRAWINGS

The invention will now be described in more detail with reference to an embodiment given by way of example but to which the invention is not limited.

DETAILED DESCRIPTION

Figure 1:
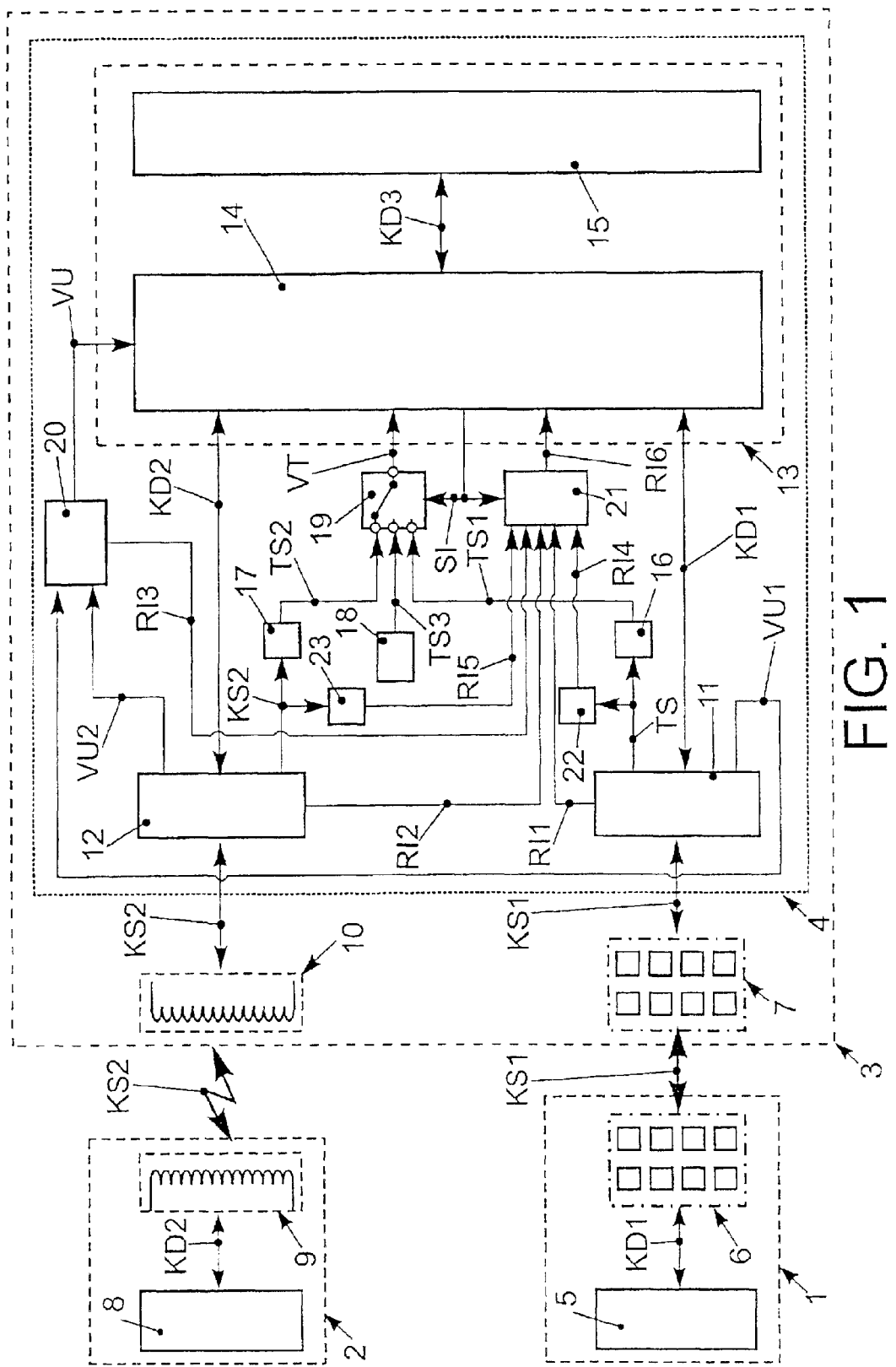
FIG. 1 shows a smart card for the simultaneous contactless and contact-bound communication of communication device, whose data carrier has a frequency sensor for each interface means in order to supply frequency reset information.

FIG. 1 shows a write/read station 1, a transmitting/receiving station 2 and a smart card 3. A data carrier 4 of the smart card 3, which data carrier takes the form of an integrated circuit, is adapted to provide contact-bound communication with the write/read station 1 and to provide contactless communication with the transmitting/receiving station 2.

The write/read station 1 includes processing means 5 adapted to execute a first communication protocol and to process first communication data KD 1 to be supplied to the smart card 3 or received from the smart card 3. The write/read station 1 further has a contact pad 6, which corresponds to a contact pad 7 of the smart card 3 and which is defined in the standard ISO7816. The write/read station 1 now takes the form of an automated teller machine of a bank.

When a user of the smart card inserts the smart card 3 into the write/read station 1 the corresponding contacts of the contact pads 6 and 7 enter into contact with one another. Via a respective one of the contacts of the contact pad 7 the data carrier 4 then receives a first supply voltage VU1, first reset information RI1, a clock signal TS, the first communication data KD1 as well as further signals, which are symbolically represented together as a first communication signal KS1.

The transmitting/receiving station 2 includes processing means 8 adapted to execute a second communication protocol and to process second communication data KD2 to be transmitted to the smart card 3 or received from the smart card 3. In the present case, the communication protocol executed by the processing means 8 complies with the standard ISO14443.

The transmitting/receiving station 2 further includes a transmitting/receiving stage 9 via which the second communication data KD2 to be transferred can be supplied from the processing means 8 to a transmitting/receiving stage 10 of the smart card 3 as second communication signal KS2. Here, the second communication signal KS2 is a high-frequency signal having a frequency of 13.56 MHz, as laid down in the standard ISO14443.

The data carrier 4 now has first interface means 11, which also execute the first communication protocol and are then adapted to receive the first communication signal KS1 from the write/read station 1 and to supply the first communication signal KS1 to the write/read station 1.

The data carrier 4 further has second interface means 12, which also execute the second communication protocol and are then adapted to receive the second communication signal KS2 from the transmitting/receiving station 2. The second interface means 12 include modulation means for carrying out a load modulation of the second communication signal KS2 in accordance with the second communication data KD2 to be transmitted. The second communication signal KS2 influenced by the load modulation can be received by the transmitting/receiving station 2 and the transmitted second communication data KD2 can be detected by the processing means 8 by demodulation of the influenced second communication signal KS2.

The data carrier 4 further has processing means 13, which include an calculating stage 14 and a memory stage 15. The calculating means 14 is formed by a microprocessor of the 80C51 type and the memory stage 15 is formed by a RAM (Random Access Memory), a ROM (Read Only Memory) and an EEPROM (Electrically Erasable Programmable Read Only Memory). The calculating stage 14 is arranged to receive the first communication data KD1 received by the first interface means 11 and the second communication data KD2 received by the second interface means 12.

The calculating stage 14 carries out a processing program in which the communication data KD1 or KD2 received or to be supplied are processed and, if applicable, third communication data KD3 are stored in the memory stage 15. Since the smart card 3 is used as a bank card for the withdrawal of cash from the automated-teller machine (write/read station 1) the third communication data KD3 stored in the memory stage 15 are partly strictly secret. The speed with which the processing program is executed by means of the calculating stage 14 is defined by a processing clock VT applied to the calculating stage 14.

The data carrier 4 further has a first clock derivation stage 16 to which the clock signal TS can be applied, which clock signal is supplied by the write/read station 1 via a contact of the contact pad 6 and which is symbolically included in the first communication signal KS1. The first clock derivation stage 16 is adapted to derive a first clock signal TS1 having a first clock frequency from the clock signal TS applied to it. Here, deriving a clock signal is to be understood to mean that the frequency of the received clock signal TS is multiplied (for example, doubled, tripled, . . . ), reduced (for example, halved, divided by three, . . . ) but also that it is left unchanged and output as the first clock signal TS1.

The data carrier 4 further has a second clock derivation stage 17 to which the second communication signal KS2 can be applied by the second interface means 12. The second clock derivation stage 17 is adapted to derive a second clock signal TS2 having a second clock frequency from the second communication signal KS2.

The data carrier 4 further has clock generation means 18 adapted to generate an internal third clock signal TS3 which is independent of the first communication signal KS1 and the second communication signal KS2. The third clock signal TS3 has a third clock frequency.

The data carrier 4 further has a clock selection stage 19 arranged to receive the first clock signal TS1 supplied by the first clock derivation stage 16, the second clock signal TS2 supplied by the second clock derivation stage 17, and the third clock signal TS3 generated by the clock generation means 18. The clock selection means 19 is now formed by a switch, whose switch position is defined by switch information SI supply by the calculating stage 14. Depending on the switch information SI either the first clock signal TS1, the second clock signal TS2 or the third clock signal TS3 is applied to the calculating stage 14 as the processing clock VT.

The data carrier 4 further has a voltage supply stage 20 adapted to energize all the stages and means of the data carrier 4 with a supply voltage VU. For this purpose, the first supply voltage V1 received by the first interface means 11 and symbolically included in the first communication signal KS1 as well as a second supply voltage VU2 from the second interface means 12 can be applied to the voltage supply stage 20. The second supply voltage VU2 is generated by the second interface means 12 by rectification of the second communication signal KS2, as is common practice. The voltage supply stage 20 supplies either the first supply voltage VU1 or the second supply voltage VU2 to the stages and means of the data carrier 4 as the supply voltage VU.

The data carrier 4 further has reset means 21 adapted to reset the processing by the calculating stage 14. As is common usage, resetting is to be understood to mean that the processing program executed by the calculating stage 14 is interrupted and the execution of the processing program is restarted from the beginning of the processing program. All the communication data KD1, KD2 and KD3 just processed by means of the calculating stage 14 are then rejected, which may lead to a loss of data but in any case leads to a loss of processing time. After a reset of the calculating stage 14 the calculating stage 14 requires a few 100 microseconds of processing time before the processing program has returned to a state in which processing of the communication data KD1 and KD2 received from the write/read station 1 or the transmitting/receiving station 2 can be started.

The first reset information RI1 received from the write/read station 1 via the contact pads 6 and 7 and contained in the first communication signal KS1 can be applied from the first interface means 11 to the reset means 21. Furthermore, second reset information RI2 generated by the second interface means 12 can be applied to the reset means 21. The second interface means 12 generate the second reset information RI2 when, for example, an unexpected condition has occurred in the execution of the second communication protocol and the second communication data KD2 applied to the calculating stage 14 should be rejected. Third reset information RI3 can be applied to the reset means 21 by the voltage supply stage 20 when neither the first supply voltage VU1 nor the second supply voltage VU2 have an adequate voltage value for the energization of the means and the stages of the data carrier 4 with the supply voltage VU.

The data carrier 4 now includes a first frequency sensor 22 which is adapted to supply first frequency reset information RI4 to the reset means 21 when the frequency FKS1 of the first communication signal KS1 decreases below a first lower frequency threshold FU1 or exceeds a first upper frequency threshold FO1. The data carrier 4 further includes a second frequency sensor 23 which is adapted to supply second frequency reset information RI5 to the reset means 21 when the frequency FKS2 of the second communication signal KS2 decreases below a second lower frequency threshold FU2 or exceeds a second upper frequency threshold FO2.

The reset means 21 are now adapted to reset the processing by the calculating stage 14 when the first clock signal TS1 is applied to the calculating stage 14 as processing clock VT and the first frequency reset information RI4 is received, or when the second clock signal TS2 is applied to the calculating stage 14 as processing clock VT and the second frequency reset information RI5 is received. This will be elucidated with reference to the following example of use of the data carrier 4 shown in FIG. 1.

Figure 2A:
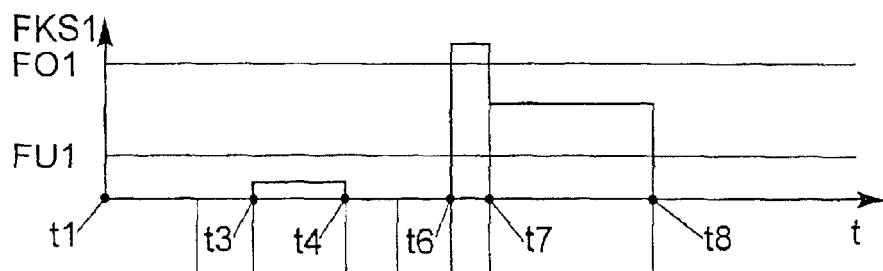
FIG. 2 shows the variation of the frequencies of communication signals and the variation of the reset information RI as occurring the data carrier of FIG. 1 as functions of time.
Figure 2B:
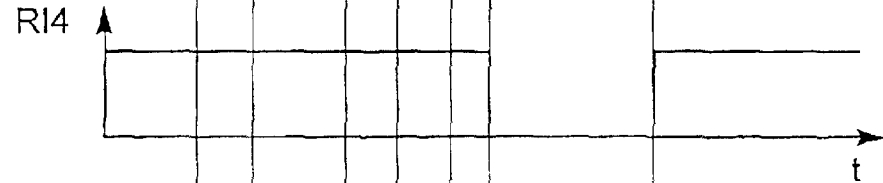
Figure 2C:
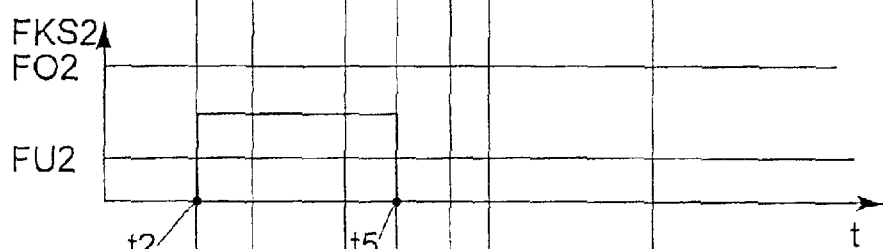
Figure 2D:
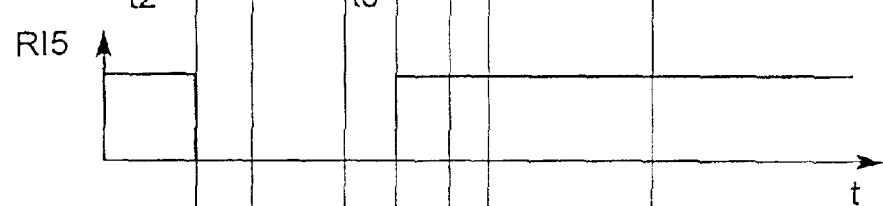
Figure 2E:
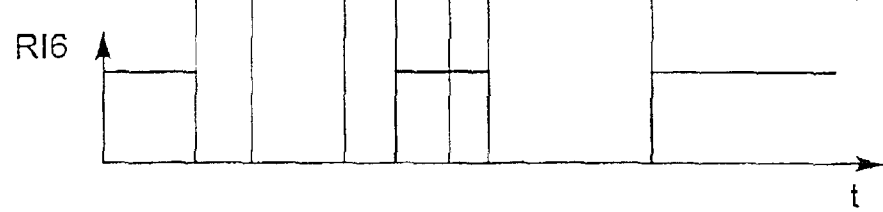

FIG. 2A represents the frequency FKS1 of the clock signal TS, contained in the first communication signal KS1, as a function of time and FIG. 2B represents the first frequency reference information RI4, supplied by the first frequency sensor 22, as a function of time. FIG. 2C represents the frequency FKS2 of the second communication signal KS2 as a function of time and FIG. 2D represents the frequency reference information RI5, supplied by the first frequency sensor 23, as a function of time. FIG. 2E shows reset information RI6 as a function of time as a function of time, which reset information is supplied by the reset means 21 after evaluation of the reference information RI1 to RI3 and the frequency reference information RI4 and RI5 and causes the processing by the calculating stage 14 to be reset.

In the example of use it is assumed that the user inserts the smart card 3 into the write/read station 1 at an instant t1 and the contacts of the contact pads 6 and 7 enter into contact with one another. Subsequently, the write/read station 1 supplies the first communication signal KS1 to the data carrier 4, which initially only contains the first supply voltage VU1, which is applied as the supply voltage VU to the stages and means of the data carrier 4 by the voltage supply stage 20. When an adequate supply voltage VU is present the voltage supply stage 20 terminates the supply of the third reset information RI3.

Since initially the first communication signal KS1 does not contain a clock signal TS the first frequency reset information RI4 is applied to the reset means 21 by the first frequency sensor 22. As the second communication signal KS2 is not received until an instant t2 the second frequency sensor 23 supplies the second frequency reset information RI5 until the instant t2, upon which the rest means 21 supply the reset information RI6 in order to reset the processing by the calculating stage 14.

As a result of this, the advantage is obtained that until the instant t2 the processing of any false first communication data KD1 not transmitted by the write/read station 1 is precluded. Moreover, this also precludes the detection of the, sometimes secret, third communication data KD3, which are stored in the memory stage 15, by a hacker.

It is to be noted that the reset means 21 also supply the reset information RI6 for resetting the processing by the calculating stage 14 when the internally generated third clock signal TS3 is supplied to the calculating stage 14 as the processing clock VT and both the first frequency reset information RI4 and the second frequency reset information is received.

This has the advantage that when a communication signal KS1 or KS2, from which a clock signal TS1 or TS2 could be derived, is received neither via the first interface means 11 nor via the second interface means 12 and, consequently, no regular contactless or contact-bound communication with the write/read station 1 or the transmitting/receiving station 2 takes place, the reset means 21 reset the calculating stage 14 and thus preclude hacking of processed or stored communication data KD1, KD2 and KD3.

At the instant t2 the transmitting/receiving station 2 is activated and transmits the communication signal KS2. Thereupon, the second clock derivation stage 17 supplies the second clock signal TS2 to the clock selection stage 19. Since the second clock frequency of the second clock signal TS2 lies between the second upper frequency threshold FO2 and the second lower frequency threshold FU2 the second frequency sensor 23 terminates the supply of the second frequency reset information RI5 at the instant t2.

Subsequently, the reset means 21 terminate the supply of the reset information RI6 to the reset means 21, upon which the calculating stage 14 supplies the switch information SI to the clock selection stage 19 in order to define the internal third clock signal TS3 as the processing clock VT for the execution of a so-called boot sequence of the processing program. Upon completion of the boot sequence the calculating stage 14 supplies the control information SI to the clock selection information 19, in order to supply the second clock signal TS2 to the calculating stage 14 as the processing clock VT. Thereupon, the clock generation means 18 terminate the generation of the third clock signal TS3, which reduces the power consumption in the data carrier 4.

Since after completion of the boot sequence the second clock signal TS2 is now applied to the calculating stage 14 as the processing clock VT and the second frequency sensor 23 does not supply second frequency reset information RI5 to the reset means, the reset means 21 no longer supply any reset information RI6 to the calculating stage 14, upon which a contactless communication of second communication data KD2 with the transmitting/receiving station 2 begins. The write/read station 1 then subsequently uses the first supply voltage VU1 as the supply voltage VU, because it has a stable voltage value.

This has the advantage that both a part (first supply voltage VU1) of the first communication signal KS1 received by the first interface means 11 and parts (second communication data KD2, derived second clock signal TS2) of the second communication signal KS2 received by the second interface means 12 can he processed simultaneously. The additional advantage is obtained that, when a clock signal TS1 or TS2 which lies within the upper and lower frequency thresholds FO1, FO2, FU1 and FU2 and is applied to the calculating stage 14 as the processing clock VT, processing of transferred communication data KD1 or KD2 is enabled.

In the present example of use it is further assumed that from an instant t3 a hacker who has gained access to a write/read station 1 supplies a clock signal TS of very low frequency in the first communication signal KS1 to the data carrier 4. The hacker thus attempts to use the clock signal TS of very low frequency as the processing clock VT for the calculating stage 14 in order to hack the communication data processed and stored in the data carrier 4 by means of a so-called voltage contrast analysis method. In this analysis method changes of the potentials at potential at particular positions of the integrated circuit of the data carrier 4 are determined with the aid of the electron microscope. However, this is possible only when the processing program is carried out very slowly and the potentials appear long enough at the individual positions of the integrated circuit to allow these potentials to be determined.

After the instant t3 the first frequency sensor 22 still supplies the first frequency reset information RI4 to the reset means 21 because the frequency of the clock signal TS is below the first lower frequency threshold FU1. The reset means 21 therefore further detect that the second clock signal TS1 supplied to the calculating stage 14 as the processing clock VT is within the second upper frequency threshold FO2 and the second lower frequency threshold FU2 and consequently no longer supply any reset information RI6 to the calculating stage 14.

This has the advantage that the processing of the second communication data KD2 received by the transmitting/receiving station 2 via the second interface means 12 is not interrupted although the clock signal TS of very low frequency is fed into the data carrier 4 via the first interface means 11. Thus, an unnecessary interruption of the processing is avoided and processing time (a few 100 microseconds) is saved while the security of the communication data KD1, KD2 or KD3 processed in the data carrier 4 remains the same.

At the instant t4 the hacker stops the supply of the low frequency clock signal TS in the first communication signal KS1 and at an instant t5 the communication of the second communication data KD2 with the transmitting/receiving station 2 is terminated. Owing to the absence of the second clock signal TS2 from the instant t5, which clock signal is defined as the processing clock VT in accordance with the control information SI, the reset means 21 supply the reset information RI6 to the calculating stage 14 as of the instant t5.

From an instant t6 the clock signal TS is received in the first communication signal KS1 at the corresponding contact of the contact pad 7, which clock signal has a clock frequency which is too high as a result of a problem in the write/read station 1. The calculating stage 14 supplies the switch information SI to the clock selection stage 19 in order to define the second clock signal TS2 as the processing clock VT and to prepare for the processing of the first communication data KD1 received from the write/read station 1.

The first frequency sensor 22 also supplies the first frequency rest information RI4 to the reset means after the instant t6 until an instant t7, because the first clock signal TS1 has a clock frequency above the first upper frequency threshold FO1. Thereupon, the reset means 21 also supply the reset information RI6 to the calculating stage 14 after the instant t6 until the instant t7.

This has the advantage that the reset means 21 preclude a processing of the received first communication data KD1 at too high a processing clock rate VT, which because of timing problems of the memory means 15 or other stages and means of the data carrier 4 could lead to an undefined processing state of the processing program of the calculating stage 14. This undefined processing state could otherwise be used by a hacker in order to detect secret first, second or third communication data.

At the instant t7 the first communication signal KS1 with the clock signal TS is now received, which clock signal is now within the first upper frequency threshold FO1 and the first lower frequency threshold FU1, for which reason the supply of the first frequency reset information RI4 by the first frequency sensor 22 is terminated. Thereupon, the boot sequence is now carried out again with the third clock signal TS3 as the processing clock rate VT. Subsequently, the first clock signal TS1 is defined as the processing clock rate VT and the calculating stage 14 processes the first communication data KD1 received with the first interface means 11. At an instant t8 the communication of the data carrier 4 with the write/read station 1 stops and the user of the smart card 1 removes the smart card 3 from the write/read station 1.

The example of use of the data carrier 4 illustrates that as a result of the provision of the frequency sensors 22 and 23 for the interface means 11 and 12 the data carrier 4 is adapted to provide parallel communication with the write/read station 1 and with the transmitting/receiving station 2 and that the calculating stage 14 always processes communication data KD1, KD2 or KD3 when this is possible without any security risk on account of a suitable processing clock rate VT.

It is to be noted that it is also possible to apply the clock signals derived by the clock derivation stages to the frequency sensors in a data carrier in accordance with the invention in order to check whether the clock signals are within given frequency thresholds. This data carrier would have the same advantages as described for the data carrier 4 in the example of use of FIG. 1.

It is to be noted that the reset means 21 could also inhibit the supply of the reset information RI6 to the calculating stage 14 when the internally generated clock signal TS3 is applied to the calculating stage 14 and both the first frequency reset information RI4 and the second frequency reset information RI5 are applied to the reset means 21.

This would have the advantage that it is not necessary to wait for the time of a few 100 microseconds required for a so-called power up after a reset of the calculating stage 14 until the calculating stage 14 is again ready for the processing of communication data. Thus, the transmitting/receiving station 2 or the write/read station 1 can immediately start the communication with the data carrier, which has the advantage that a more rapid communication is possible.

It is to be noted that a data carrier in accordance with the invention may also include three or more interface means for the communication. Each of said interface means then has an associated frequency sensor to monitor the communication signal received by the relevant interface means or a clock signal derived from this communication signal.

It is to be noted that alternatively one common frequency sensor may be provided for two or more interface means when communication via these interface means never takes place at the same time.

It is to be noted that upon completion of the boot sequence with the internally generated clock signal as the processing clock rate a data carrier in accordance with the invention could supply always the same switch information SI to the clock selection stage in order to define a given clock signal (for example, the first clock signal from the first clock derivation stage) as the processing clock. When the frequency sensor which monitors the clock signal thus defined supplies frequency reset information the reset means will supply the reset information to the calculating stage to reset the processing although perhaps another clock derivation stage supplies another clock signal within the frequency thresholds. This is advantageous because this other clock signal has not been defined as the processing clock.

It is to be noted that a frequency sensor which monitors the upper frequency threshold FO and the lower frequency threshold may be formed by, for example, a low-pass filter and a frequency sensor which only monitors the lower frequency sensor. The low-pass filter then removes all the frequency components of the communication signal above the upper frequency threshold FO. Such a frequency sensor may be of an analog type but also of a digital type.

What is claimed is:

1. A data carrier (4) for the transfer of communication data (KD1, KD2) via at least two interface means (11, 12) having
   first interface means (11) for receiving a first communication signal (KS1), and having second interface means (12) for receiving a second communication signal (KS2), and having processing means (13) to which a first clock signal (TS1) derived from the first communication signal (KS1) or a second clock signal (TS2) derived from the second communication signal (KS2) can be applied for the processing of the transferred communication data (KD1, KD2), and having
   reset means (21) for resetting the processing by the processing means (13), characterized in that
   a first frequency sensor (22) is included, which is adapted to supply first frequency reset information (RI4) to the reset means (21) when a first clock frequency of the first clock signal (TS1) or the frequency (FKS1) of the first communication signal (KS1) lies below a first lower frequency threshold (FU1), and
   a second frequency sensor (23) is included, which is adapted to supply second frequency reset information (RI5) to the reset means (21) when a second clock frequency of the second clock signal (TS2) or the frequency (FKS2) of the second communication signal (KS2) lies below a second lower frequency threshold (FU2), and
   the reset means (21) are adapted to reset the processing by the processing means (13) when the first clock signal (TS1) is applied to the processing means (13) and the first frequency reset information (RI4) is received or when the second clock signal (TS2) is applied to the processing means (13) and the second frequency reset information (RI5) is received.

2. A data carrier (4) as claimed in claim 1, characterized in that the first frequency sensor (22) is adapted to supply the first frequency reset information (RI4) to the reset means (21) when the first clock frequency or the frequency (FKS1) of the first communication signal (KS1) lies above a first upper frequency threshold (FO1), and the second frequency sensor (23) is adapted to supply the second frequency reset information (RI5) to the reset means (21) when the second clock frequency or the frequency (FKS2) of the second communication signal (KS2) lies above a second upper frequency threshold (FO2).

3. A data carrier (4) as claimed in claim 1, characterized in that clock generation means (19) are included, which means are adapted to generate an internal clock signal (TS3) having a third clock frequency, and the reset means (21) are adapted to reset the processing by the processing means (13) when the third clock signal (TS3) is applied to the processing means (13) and both the first frequency reset information (RI4) and the second frequency reset information (RI5) are applied to the reset means (21).

4. A data carrier (4) as claimed in claim 3, characterized in that clock generation means (19) are included, which means are adapted to generate the internal clock signal (TS3) having the third clock frequency, and the reset means (21) are adapted to inhibit the resetting of the processing by the processing means (13) when the third clock signal (TS3) is applied to the processing means (13) and the first frequency reset information (RI4) and/or the second frequency reset information (RI5) is applied to the reset means (21).

5. A data carrier as claimed in claim 1, characterized in that a first clock derivation stage is adapted to derive the first clock signal from the first communication signal and the first frequency sensor is adapted to apply the first frequency reset information to the first clock derivation stage when the first clock frequency of the first clock signal is below the first frequency threshold, the clock derivation stage being adapted to change the derivation of the first clock signal when the first frequency reset information is received.

6. A data carrier (4) as claimed in claim 1, characterized in that the data carrier (4) takes the form of an integrated circuit.

* * * * *